US009513865B2

(12) United States Patent
Sheen

(10) Patent No.: US 9,513,865 B2
(45) Date of Patent: Dec. 6, 2016

(54) MICROPHONE CALIBRATION

(71) Applicant: Sonos, Inc., Santa Barbara, CA (US)

(72) Inventor: Timothy W. Sheen, Brighton, MA (US)

(73) Assignee: Sonos, Inc., Santa Barbara, CA (US)

(*) Notice: Subject to any disclaimer, the term of this patent is extended or adjusted under 35 U.S.C. 154(b) by 61 days.

(21) Appl. No.: 14/481,522

(22) Filed: Sep. 9, 2014

(65) Prior Publication Data

US 2016/0073210 A1 Mar. 10, 2016

(51) Int. Cl.
*H04R 29/00* (2006.01)
*G06F 3/16* (2006.01)
(Continued)

(52) U.S. Cl.
CPC ............... *G06F 3/165* (2013.01); *G10L 21/00* (2013.01); *H04R 29/001* (2013.01);
(Continued)

(58) Field of Classification Search
CPC ..... H04R 29/001; H04R 1/008; H04R 29/004; H04R 27/00; H04R 2227/003; H04R 2227/005
(Continued)

(56) References Cited

U.S. PATENT DOCUMENTS 4,306,113 A 12/1981 Morton
4,592,088 A 5/1986 Shimada
(Continued)

FOREIGN PATENT DOCUMENTS

EP 0772374 A2 5/1997
EP 2043381 A2 4/2009
(Continued)

OTHER PUBLICATIONS

"Burger, D., "Automated Room Correction Explained" hometheaterreview.com, Nov. 18, 2013, <http://hometheaterreview.com/automated-room-correction-explained/> Retrieved Oct. 10, 2014, 3 pages".

(Continued)

*Primary Examiner* — Vivian Chin
*Assistant Examiner* — Ammar Hamid
(74) *Attorney, Agent, or Firm* — McDonnell Boehnen Hulbert & Berghoff LLP

(57) ABSTRACT

Examples described herein involve calibration of a microphone of a network device based on a first signal detected by the microphone of the network device and a second audio signal detected by a microphone of the playback device. While the network device is positioned within a predetermined physical range of a microphone of a playback device, a microphone of the network device may detect a first audio signal. The network device may also receive data indicating a second audio signal detected by the microphone of the playback device. Based on data indicating the first audio signal and the data indicating the second audio signal, the network device may identify a microphone calibration algorithm, and apply the microphone calibration algorithm when performing a calibration function associated with the playback device. Similar functions may also be performed by a computing device, such as a server to coordinate calibration of the microphone of the network device.

20 Claims, 10 Drawing Sheets

(51) Int. Cl.
*G10L 21/00* (2013.01)
*H04R 27/00* (2006.01)

(52) U.S. Cl.
CPC ........... *H04R 29/004* (2013.01); *H04R 27/00* (2013.01); *H04R 2227/003* (2013.01); *H04R 2227/005* (2013.01)

(58) Field of Classification Search
USPC ............................... 381/59, 122, 56; 700/94
See application file for complete search history.

(56) References Cited

U.S. PATENT DOCUMENTS

| | | |
|---|---|---|
| 4,631,749 A | 12/1986 | Rapaich |
| 5,218,710 A | 6/1993 | Yamaki et al. |
| 5,386,478 A | 1/1995 | Plunkett |
| 5,553,147 A | 9/1996 | Pineau |
| 5,923,902 A | 7/1999 | Inagaki |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,643,744 B1 | 11/2003 | Cheng |
| 6,704,421 B1 | 3/2004 | Kitamura |
| 6,721,428 B1 | 4/2004 | Allred et al. |
| 6,757,517 B2 | 6/2004 | Chang |
| 6,766,025 B1 | 7/2004 | Levy et al. |
| 6,778,869 B2 | 8/2004 | Champion |
| 6,916,980 B2 | 7/2005 | Ishida et al. |
| 6,931,134 B1 | 8/2005 | Waller, Jr. et al. |
| 6,985,694 B1 | 1/2006 | De Bonet et al. |
| 7,058,186 B2 | 6/2006 | Tanaka |
| 7,103,187 B1 | 9/2006 | Neuman |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,312,785 B2 | 12/2007 | Tsuk et al. |
| 7,483,538 B2 | 1/2009 | McCarty et al. |
| 7,483,540 B2 | 1/2009 | Rabinowitz et al. |
| 7,489,784 B2 | 2/2009 | Yoshino |
| 7,492,909 B2 | 2/2009 | Carter et al. |
| 7,529,377 B2 | 5/2009 | Nackvi et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,676,044 B2 | 3/2010 | Sasaki et al. |
| 7,689,305 B2 | 3/2010 | Kreifeldt et al. |
| 7,742,740 B2 | 6/2010 | Goldberg et al. |
| 7,769,183 B2 | 8/2010 | Bharitkar et al. |
| 7,835,689 B2 | 11/2010 | Goldberg et al. |
| 7,853,341 B2 | 12/2010 | McCarty et al. |
| 7,949,140 B2 | 5/2011 | Kino |
| 7,949,707 B2 | 5/2011 | McDowall et al. |
| 7,961,893 B2 | 6/2011 | Kino |
| 8,005,228 B2 | 8/2011 | Bharitkar et al. |
| 8,014,423 B2 | 9/2011 | Thaler et al. |
| 8,045,721 B2 | 10/2011 | Burgan et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,116,476 B2 | 2/2012 | Inohara |
| 8,126,172 B2 | 2/2012 | Horbach et al. |
| 8,131,390 B2 | 3/2012 | Braithwaite et al. |
| 8,144,883 B2 | 3/2012 | Pedersen et al. |
| 8,170,260 B2 | 5/2012 | Reining et al. |
| 8,175,297 B1 | 5/2012 | Ho et al. |
| 8,194,874 B2 | 6/2012 | Starobin et al. |
| 8,234,395 B2 | 7/2012 | Millington |
| 8,270,620 B2 | 9/2012 | Christensen |
| 8,279,709 B2 | 10/2012 | Choisel et al. |
| 8,281,001 B2 | 10/2012 | Busam et al. |
| 8,300,845 B2 | 10/2012 | Zurek et al. |
| 8,325,931 B2 | 12/2012 | Howard et al. |
| 8,332,414 B2 | 12/2012 | Nguyen et al. |
| 8,401,202 B2 | 3/2013 | Brooking |
| 8,433,076 B2 | 4/2013 | Zurek et al. |
| 8,463,184 B2 | 6/2013 | Dua |
| 8,577,048 B2 | 11/2013 | Chaikin et al. |
| 8,731,206 B1 | 5/2014 | Park |
| 8,819,554 B2 | 8/2014 | Basso et al. |
| 8,930,005 B2 | 1/2015 | Reimann |
| 8,965,033 B2 | 2/2015 | Wiggins |
| 9,215,545 B2 | 12/2015 | Dublin et al. |
| 9,288,597 B2 | 3/2016 | Carlsson et al. |
| 9,300,266 B2 | 3/2016 | Grokop |
| 9,319,816 B1 | 4/2016 | Narayanan |
| 2001/0042107 A1 | 11/2001 | Palm |
| 2001/0043592 A1 | 11/2001 | Jimenez et al. |
| 2002/0022453 A1 | 2/2002 | Balog et al. |
| 2002/0026442 A1 | 2/2002 | Lipscomb et al. |
| 2002/0078161 A1 | 6/2002 | Cheng |
| 2002/0089529 A1 | 7/2002 | Robbin |
| 2002/0124097 A1 | 9/2002 | Isely et al. |
| 2003/0002689 A1 | 1/2003 | Folio |
| 2003/0157951 A1 | 8/2003 | Hasty |
| 2003/0161479 A1 | 8/2003 | Yang et al. |
| 2004/0024478 A1 | 2/2004 | Hans et al. |
| 2004/0237750 A1 | 12/2004 | Smith et al. |
| 2005/0147261 A1 | 7/2005 | Yeh |
| 2005/0157885 A1 | 7/2005 | Olney et al. |
| 2006/0008256 A1 | 1/2006 | Khedouri et al. |
| 2006/0026521 A1 | 2/2006 | Hotelling et al. |
| 2006/0032357 A1* | 2/2006 | Roovers ................. H04R 3/005 84/1 |
| 2006/0195480 A1 | 8/2006 | Spiegelman et al. |
| 2006/0225097 A1 | 10/2006 | Lawrence-Apfelbaum |
| 2007/0003067 A1 | 1/2007 | Gierl et al. |
| 2007/0121955 A1 | 5/2007 | Johnston et al. |
| 2007/0142944 A1 | 6/2007 | Goldberg et al. |
| 2008/0002839 A1 | 1/2008 | Eng |
| 2008/0098027 A1 | 4/2008 | Aarts |
| 2008/0144864 A1 | 6/2008 | Huon |
| 2008/0175411 A1 | 7/2008 | Greve |
| 2009/0024662 A1 | 1/2009 | Park et al. |
| 2009/0047993 A1 | 2/2009 | Vasa |
| 2009/0063274 A1 | 3/2009 | Dublin, III et al. |
| 2011/0087842 A1 | 4/2011 | Lu et al. |
| 2011/0091055 A1 | 4/2011 | Leblanc |
| 2011/0234480 A1 | 9/2011 | Fino et al. |
| 2012/0148075 A1 | 6/2012 | Goh et al. |
| 2012/0268145 A1 | 10/2012 | Chandra et al. |
| 2012/0288124 A1 | 11/2012 | Fejzo et al. |
| 2013/0066453 A1 | 3/2013 | Seefeldt |
| 2013/0129122 A1 | 5/2013 | Johnson et al. |
| 2013/0170647 A1 | 7/2013 | Reilly |
| 2013/0230175 A1 | 9/2013 | Bech et al. |
| 2013/0279706 A1 | 10/2013 | Marti |
| 2013/0305152 A1 | 11/2013 | Griffiths et al. |
| 2013/0329896 A1* | 12/2013 | Krishnaswamy .... H04R 29/005 381/58 |
| 2014/0003625 A1 | 1/2014 | Sheen et al. |
| 2014/0037097 A1 | 2/2014 | Labosco |
| 2014/0064501 A1 | 3/2014 | Olsen et al. |
| 2014/0079242 A1 | 3/2014 | Nguyen et al. |
| 2014/0161265 A1 | 6/2014 | Chaikin et al. |
| 2014/0242913 A1 | 8/2014 | Pang |
| 2014/0267148 A1 | 9/2014 | Luna et al. |
| 2014/0270202 A1 | 9/2014 | Ivanov et al. |
| 2014/0273859 A1 | 9/2014 | Luna et al. |
| 2014/0279889 A1 | 9/2014 | Luna |
| 2014/0285313 A1 | 9/2014 | Luna et al. |
| 2014/0286496 A1 | 9/2014 | Luna et al. |
| 2014/0321670 A1 | 10/2014 | Nystrom et al. |
| 2014/0344689 A1 | 11/2014 | Scott et al. |
| 2015/0032844 A1 | 1/2015 | Tarr et al. |
| 2015/0043736 A1 | 2/2015 | Olsen et al. |
| 2015/0100991 A1 | 4/2015 | Risberg et al. |

(56) References Cited

U.S. PATENT DOCUMENTS

2016/0007116 A1 1/2016 Holman
2016/0021458 A1 1/2016 Johnson et al.
2016/0029142 A1 1/2016 Isaac

FOREIGN PATENT DOCUMENTS

| EP | 2161950 A2 | 3/2010 |
| EP | 2194471 A1 | 6/2010 |
| EP | 2591617 B1 | 6/2014 |
| WO | 0153994 | 7/2001 |
| WO | 2015178950 A1 | 11/2015 |

OTHER PUBLICATIONS

""Constellation Acoustic System: a revolutionary breakthrough in acoustical design" Meyer Sound Laboratories, Inc., <http://www.meyersound.com/brochures/constellation_brochure_c.pdf> 2012, 32 pages".
""Constellation Microphones," Meyer Sound Laboratories, Inc., <http://www.meyersound.com/sites.default/files/constellation_microphones.pdf> 2013, 2 pages".
Co-pending US patent application No. US201414216306, filed Mar. 17, 2014.
"Daddy, B., "Calibrating Your Audio with a Sound Pressure Level (SPL) Meter," Blue-ray.com, Feb. 22, 2008 <http://forum.blu-ray.com/showthread.php?t=38765> Retrieved Oct. 10, 2014, 15 pages".
"Mulcahy, J. "Room EQ Wizard: Room Acoustics Software" REW 2014 <http://www.roomeqwizard.com> Retrieved Oct. 10, 2014, 4 pages".
"Ross, Alex. "Wizards of Sound: Retouching acoustics, from the restaurant to the concert hall" The New Yorker, Feb. 23, 2015. Web. Feb. 26, 2015".
International Searching Authority, International Search Report and Written Opinion mailed on Nov. 23, 2015, issued in connection with International Application No. PCT/US2015/048944, filed on Sep. 8, 2015, 12 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages".
"Bluetooth. "Specification of the Bluetooth System: Wireless connections made easy" Core, Version 1.0 B, Dec. 1, 1999, 1076 pages".
"Dell, Inc. "Dell Digital Audio Receiver: Reference Guide" Jun. 2000, 70 pages".
"Dell, Inc. "Start Here" Jun. 2000, 2 pages".
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".
"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".
Microsoft; Corporation., "Using Microsoft Outlook 2003", Cambridge College, 2003.
Motorola., "Simplefi, Wireless Digital Audio Receiver, Installation and User Guide", Dec. 31, 2001.
"Palm, Inc. "Handbook for the Palm VII Handheld" May 2000, 311 pages".
Prismiq; Inc., "PRISMIQ Media Player User Guide", 2003, 44 pages.
"UPnP; "Universal Plug and Play Device Architecture"; Jun. 8, 2000; version 1.0; Microsoft Corporation; pp. 1-54".
"Presentations at WinHEC 2000" May 2000, 138 pages.
Non-Final Office Action mailed on Feb. 18, 2016, issued in connection with U.S. Appl. No. 14/644,136, filed Mar. 10, 2015, 10 pages.

* cited by examiner

MICROPHONE CALIBRATION

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
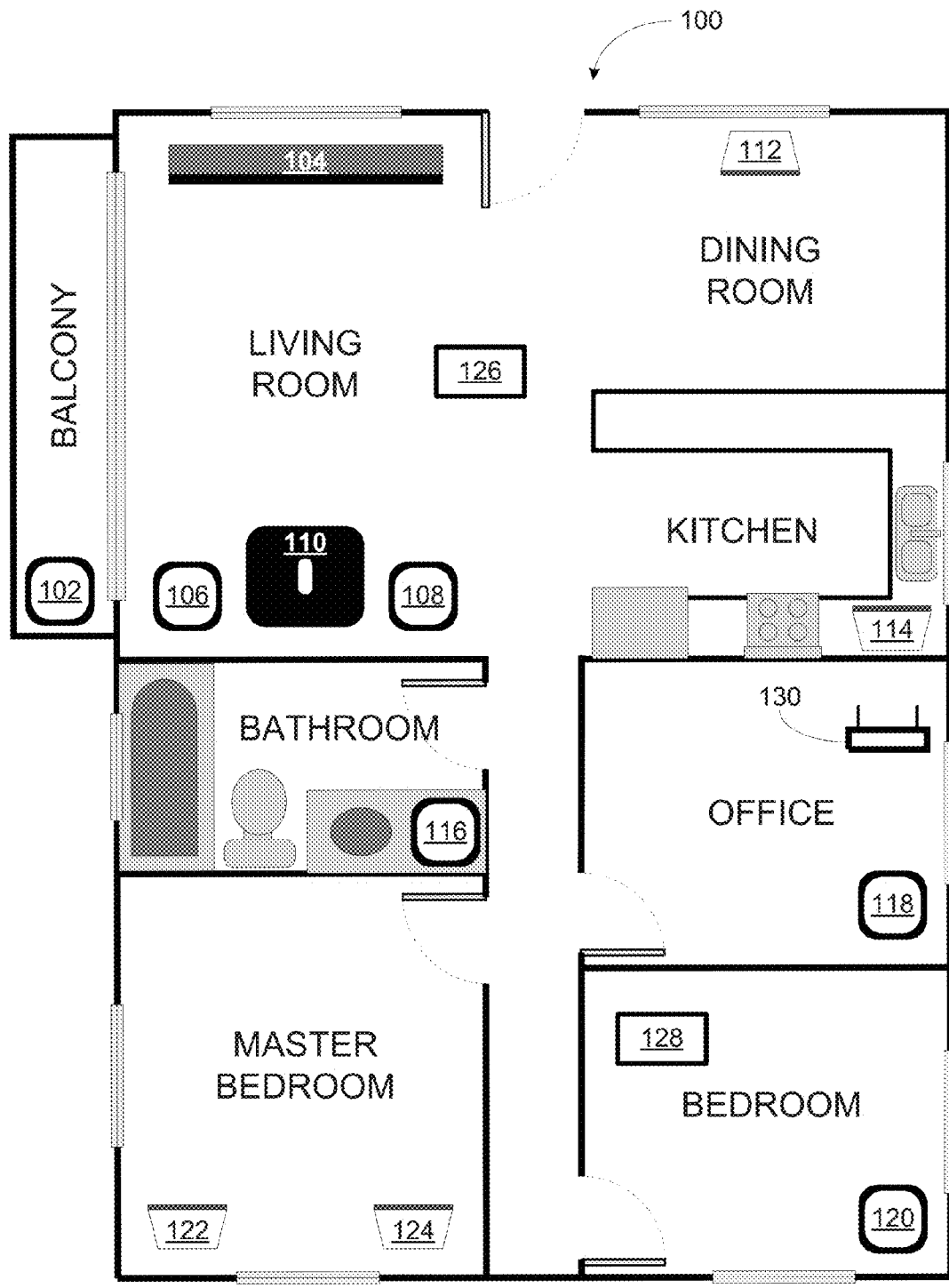
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Calibration of one or more playback devices for a playback environment using a microphone may involve an acoustic characteristic of the microphone. In some cases, however, the acoustic characteristic of a microphone of a network device that is used for the calibration of one or more playback devices may not be known.

Examples discussed herein relate to calibrations of a microphone of a network device based on an audio signal detected by the microphone of the network device while the network device is positioned within a predetermined physical range of a microphone of a playback device.

In one example, functions of the calibration may be coordinated and at least partially performed by the network device. In one case, the network device may be a mobile device with a built-in microphone. The network device may also be a controller device used to control the one or more playback devices.

While the network device is positioned within a predetermined physical range of a microphone of a playback device, the microphone of the network device may detect a first audio signal. In one example, a position within the predetermined physical range of the microphone of the playback device may be one of a position above the playback device, a position behind the playback device, a position to a side of the playback device, and a position in front of the playback device, among other possibilities.

The network device may also receive data indicating a second audio signal detected by the microphone of the playback device. Both the first audio signal and second audio signal may include portions corresponding to a third audio signal played by one or more playback device. The one or more playback devices may include the playback device having the microphone within a predetermined physical range of which the network device may be positioned. The first audio signal and the second audio signal may be detected by the respective microphones concurrently or at different times. The data indicating the second audio signal may be received by the network device before or after the first audio signal is detected by the microphone of the network device.

The network device may then identify a microphone calibration algorithm based on data indicating the first audio signal and the data indicating the second audio signal, and accordingly apply the determined microphone calibration algorithm when performing functions, such as a calibration function, associated with the playback device.

In another example, functions of the calibration may be coordinated and at least partially performed by a computing device, such as a server in communication with the playback device and/or the network device.

The computing device may receive from the network device, data indicating a first audio signal detected by a microphone of the network device while the network device was positioned within a predetermined physical range of a microphone of a playback device. The computing device may also receive data indicating a second audio signal detected by the microphone of the playback device. The computing device may then identify a microphone calibration algorithm based on the data indicating the first audio signal and the data indicating the second audio signal. In one case, the computing device may then apply the determined microphone calibration algorithm when performing functions, such as a calibration function, associated with the network device and the playback device. In one case, the computing device may also transmit data indicating the determined microphone calibration algorithm to the network device for the network device to apply when performing functions associated with the playback device.

In one case, identification of the microphone calibration algorithm may involve accessing a database of microphone calibration algorithms and microphone acoustic characteristics to identify a microphone calibration algorithm based on a microphone acoustic characteristic of the microphone of the network device. The microphone acoustic characteristic may be determined based on the data indicating the first audio signal and the data indicating the second audio signal.

In another case, identification of the microphone calibration algorithm may involve calculating the microphone calibration algorithm based on the data indicating the first audio signal and the data indicating the second audio signal. For instance, the microphone calibration algorithm may be calculated such that applying the determined microphone calibration algorithm by the one or more playback devices when playing the audio content in the in the playback environment produces a third audio signal having a normalized audio characteristic. For instance, if the microphone acoustic characteristic involves a lower sensitivity at a particular frequency, the microphone calibration algorithm may account for the lower sensitivity, such as by amplifying audio content detected by the microphone at the particular frequency.

As indicated above, calibration of the microphone of the network device may be initiated when the microphone of the network device is used to perform functions such as a calibration function associated with one or more playback device, but an acoustic characteristic of the microphone or microphone calibration algorithm that corresponds to the microphone is not available. As such, calibration of the microphone may be initiated by a device performing the calibration function associated with the one or more playback devices.

As also indicated above, the network device may be a controller device used to control the one or more playback devices. As such, in one case, calibration of the microphone of the network device may be initiated when the controller device is set up to control the one or more playback devices. Other examples are also possible.

In one example, an association between the determined calibration algorithm one or more characteristics, such as a model of the network device, may be stored as an entry in a database of microphone calibration algorithms. The microphone calibration algorithm may then be identified and applied when another network device having at least one of the one or more characteristics of the network device.

As indicated above, the present discussions involve calibrations of a microphone of a network device based on an audio signal detected by the microphone of the network device while the network device is positioned within a predetermined physical range of a microphone of a playback device. In one aspect, a network device is provided. The network device includes a microphone, a processor, and memory having stored thereon instructions executable by the processor to cause the playback device to perform functions. The functions include while (i) a playback device is playing a first audio signal and (ii) the network device is moving from a first physical location to a second physical location, detecting by the microphone, a second audio signal, based on data indicating the second audio signal, identifying an audio processing algorithm, and transmitting, to the playback device, data indicating the identified audio processing algorithm.

In another aspect, a playback device is provided. The playback device includes a processor, and memory having stored thereon instructions executable by the processor to cause the playback device to perform functions. The functions include playing a first audio signal, receiving from a network device, data indicating a second audio signal detected by a microphone of the network device while the network device was moving from a first physical location to a second physical location within a playback environment, identifying an audio processing algorithm based on the data indicating the second audio signal, and applying the identified audio processing algorithm when playing audio content in the playback environment.

In another aspect a non-transitory computer readable medium is provided. The non-transitory computer readable medium has stored thereon instructions executable by a computing device to cause the computing device to perform functions. The functions include receiving from a network device, data indicating an audio signal detected by a microphone of a network device while the network device moved within a playback environment from a first physical location to a second physical location, identifying an audio processing algorithm based on data indicating the detected audio signal, and transmitting to a playback device in the playback environment, data indicating the audio processing algorithm.

In another aspect, a network device is provided. The network device includes a microphone, a processor, and memory having stored thereon instructions executable by the processor to cause the playback device to perform functions. The functions include while the network device is positioned within a predetermined physical range of a microphone of a playback device, detecting by the microphone of the network device, a first audio signal, receiving data indicating a second audio signal detected by the microphone of the playback device, based on data indicating the first audio signal and the data indicating the second audio signal, identifying a microphone calibration algorithm, and applying the microphone calibration algorithm when performing a calibration function associated with the playback device.

In another aspect, a computing device is provided. The computing device includes a processor, and memory having stored thereon instructions executable by the processor to cause the playback device to perform functions. The functions include receiving from a network device, data indicating a first audio signal detected by a microphone of the network device while the network device was positioned within a predetermined physical range of a microphone of a playback device, receiving data indicating a second audio signal detected by the microphone of the playback device, based on the data indicating the first audio signal and the data indicating the second audio signal, identifying a microphone calibration algorithm, and applying the microphone calibration algorithm when performing a calibration function associated with the network device and the playback device.

In another aspect, a non-transitory computer readable medium is provided. The non-transitory computer readable medium has stored thereon instructions executable by a computing device to cause the computing device to perform functions. The functions include receiving from a network device, data indicating a first audio signal detected by a microphone of the network device while the network device was positioned within a predetermined physical range of a microphone of a playback device, receiving data indicating a second audio signal detected by the microphone of the playback device, based on data indicating the first audio signal and the data indicating the second audio signal, identifying a microphone calibration algorithm, and causing for storage in a database, an association between the determined microphone calibration algorithm and one or more characteristics of the microphone of the network device.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
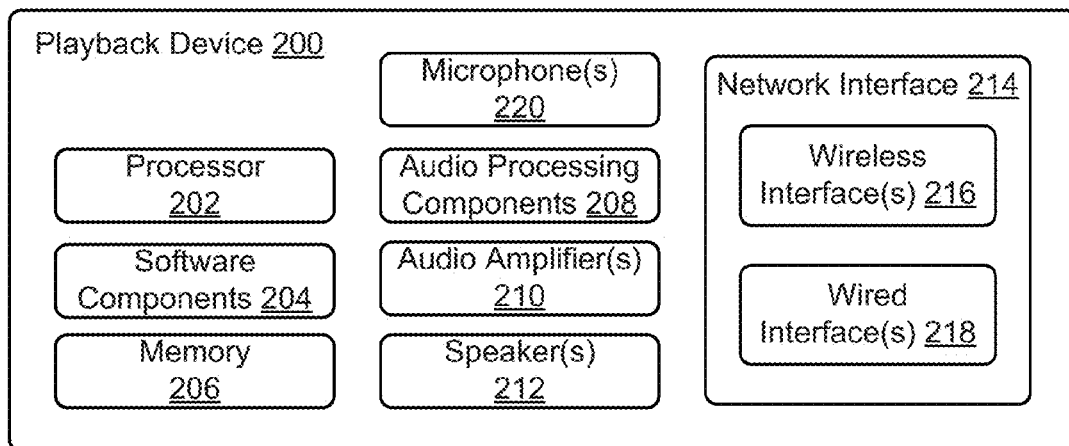
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
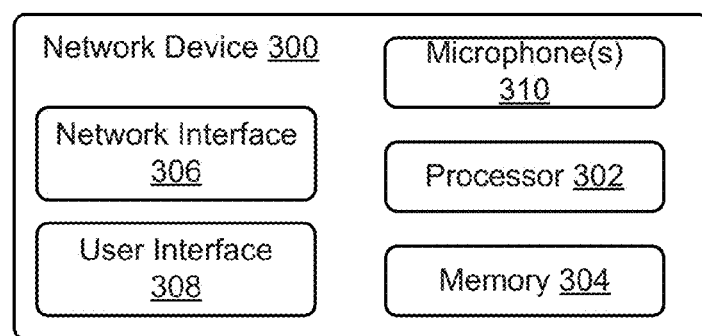
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
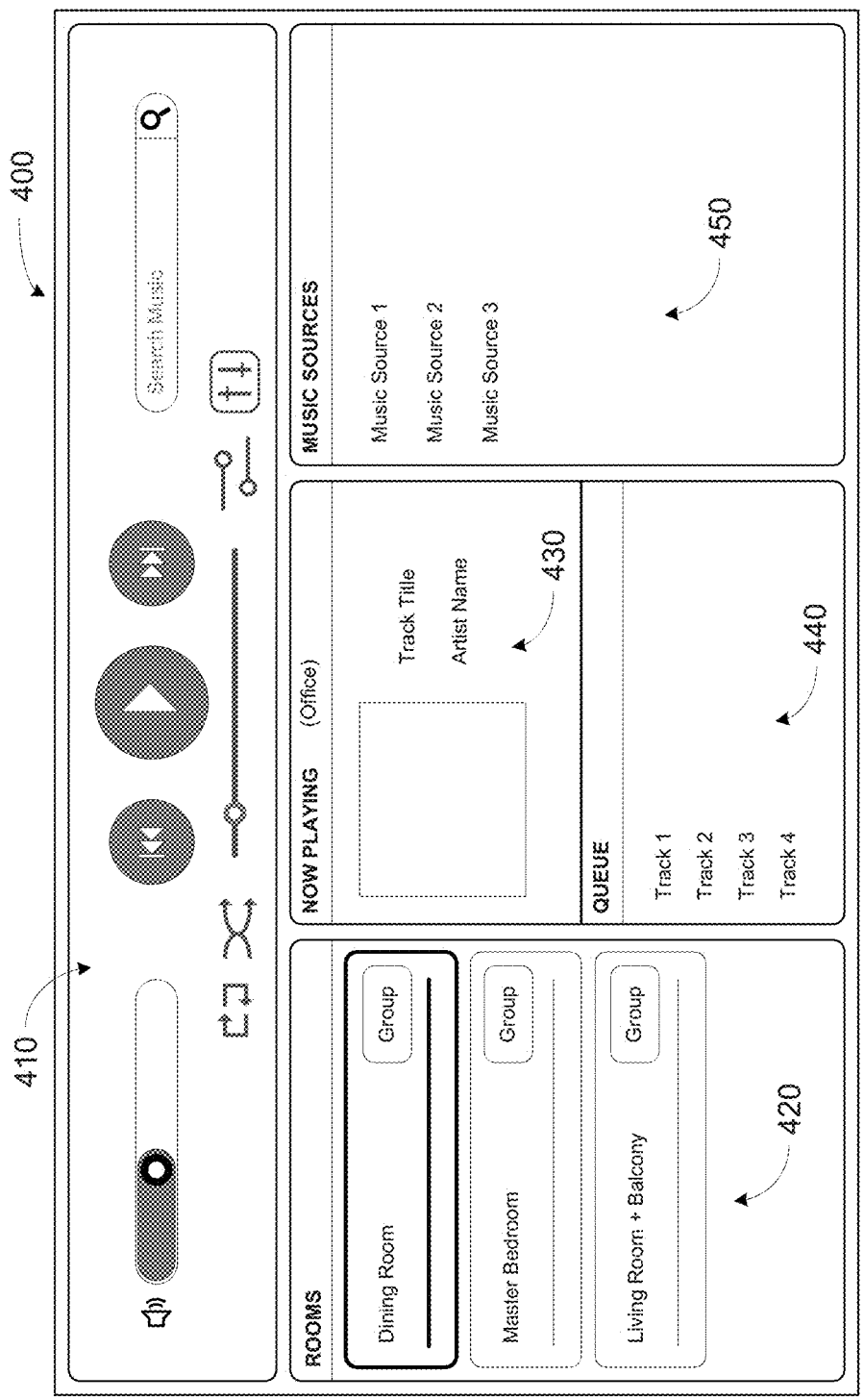
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Calibration of a Playback Device for a Playback Environment

As indicated above, examples described herein relate to calibrating one or more playback devices for a playback environment based on audio signals detected by a microphone of a network device as the network device moves about within the playback environment.

In one example, calibration of a playback device may be initiated when the playback device is being set up for the first time or if the playback device has been moved to a new location. For instance, if the playback device is moved to a new location, calibration of the playback device may be initiated based on a detection of the movement (i.e. via a global positioning system (GPS), one or more accelerometers, or wireless signal strength variations, among others), or based on a user input to indicating that the playback device has moved to a new location (i.e. a change in playback zone name associated with the playback device).

In another example, calibration of the playback device may be initiated via a controller device (such as the network device). For instance, a user may access a controller interface for the playback device to initiate calibration of the playback device. In one case, the user may access the controller interface, and select the playback device (or a group of playback devices that includes the playback device) for calibration. In some cases, a calibration interface may be provided as part of a playback device controller interface to allow a user to initiate playback device calibration. Other examples are also possible.

Methods 500, 700, and 800, as will be discussed below are example methods that may be performed to calibrate the one or more playback device for a playback environment.

a. First Example Method for Calibrating One or More Playback Devices

Figure 5:
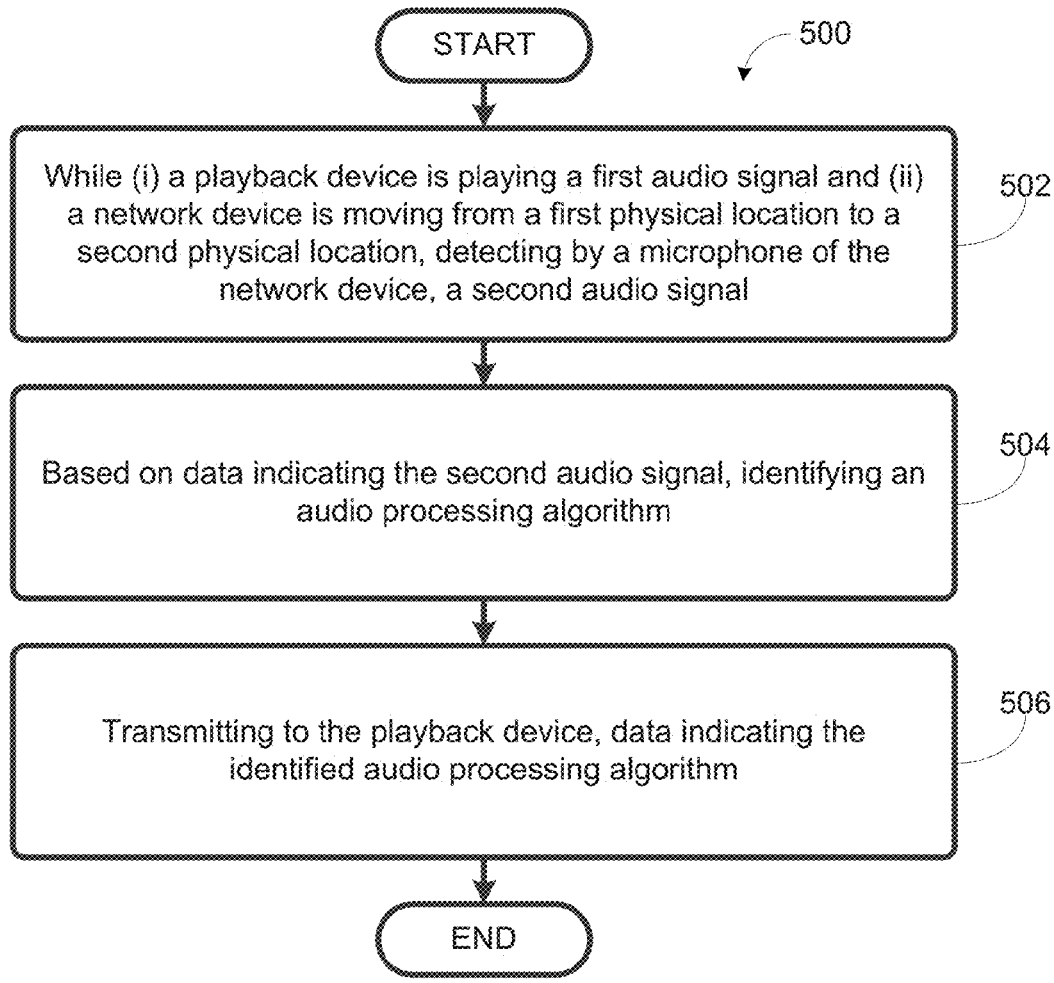
FIG. 5 shows an example flow diagram of a first method for calibrating a playback device.

FIG. 5 shows an example flow diagram of a first method 500 for calibrating a playback device based on an audio signal detected by a microphone of a network device moving about within a playback environment. Method 500 shown in FIG. 5 presents an embodiment of a method that can be implemented within an operating environment involving, for example, the media playback system 100 of FIG. 1, one or more of the playback device 200 of FIG. 2, one or more of the control device 300 of FIG. 3, as well as the playback environment 600 of FIG. 6, which will be discussed below. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block may represent circuitry that is wired to perform the specific logical functions in the process.

In one example, method 500 may be performed at least in part by the network device of which a built-in microphone may be used to for calibrating one or more playback devices. As shown in FIG. 5, the method 500 involves while (i) a playback device is playing a first audio signal and (ii) a network device is moving from a first physical location to a second physical location, detecting by a microphone of the network device, a second audio signal at block 502; based on the data indicating the second audio signal, identifying an audio processing algorithm at block 504; and transmitting to the playback device, data indicating the identified audio processing algorithm at block 506.

Figure 6:
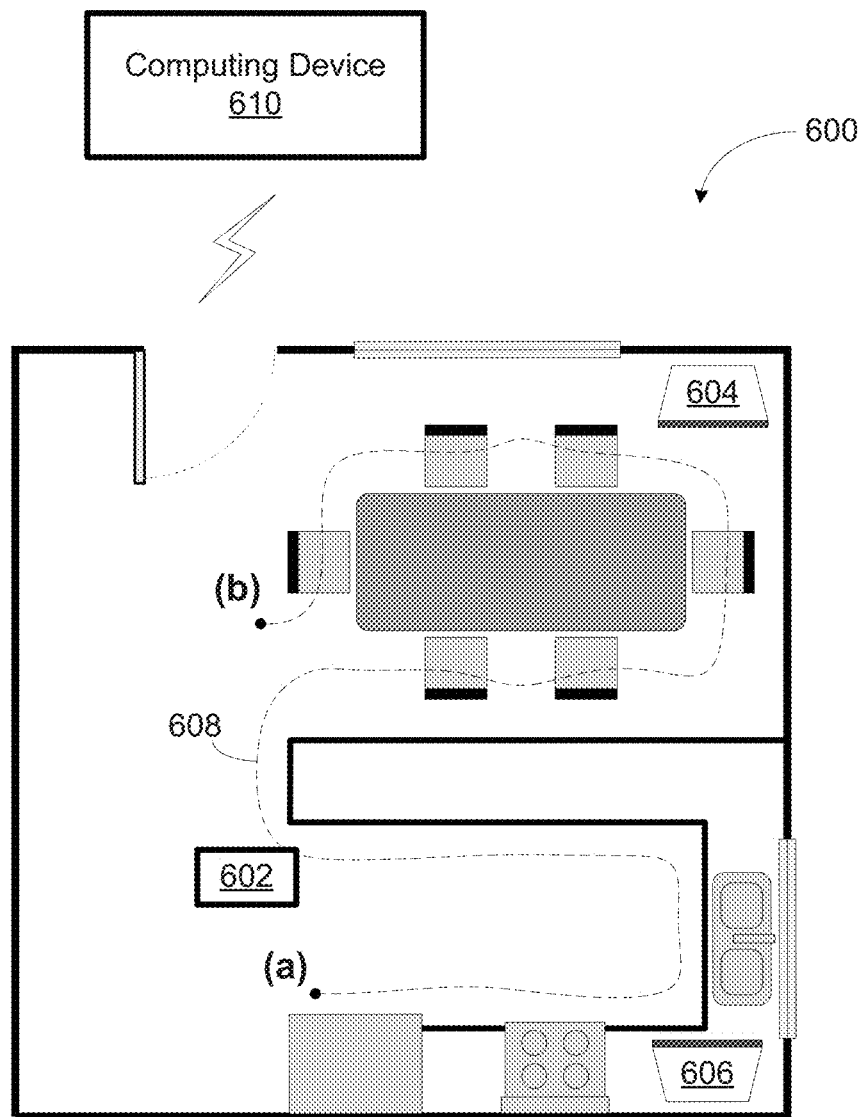
FIG. 6 shows an example playback environment within which a playback device may be calibrated.

To aid in illustrating method 500, as well as methods 700 and 800, the playback environment 600 of FIG. 6 is provided. As shown in FIG. 6, the playback environment 600 includes a network device 602, a playback device 604, a playback device 606, and a computing device 610. The network device 602, which may be coordinating and/or performing at least a portion of the method 500 may be similar to the control device 300 of FIG. 3. The playback devices 604 and 606 may both be similar to the playback device 200 of FIG. 2. One or both of the playback devices 604 and 606 may be calibrated according to the method 500, 700, or 800. The computing device 810 may be a server in communication with a media playback system that includes the playback devices 604 and 606. The computing device 810 may further be in communication, either directly or indirectly with the network device 602. While the discussions below in connection to methods 500, 700, and 800 may refer to the playback environment 600 of FIG. 6, one having ordinary skill in the art will appreciate that the playback environment 600 is only one example of a playback environment within which a playback device may be calibrated. Other examples are also possible.

Referring back to the method 500, block 502 involves while (i) a playback device is playing a first audio signal and (ii) the network device is moving from a first physical location to a second physical location, detecting by a microphone of the network device, a second audio signal. The playback device is the playback device being calibrated, and may be one of one or more playback devices in a playback environment, and may be configured to play audio content individually, or in synchrony with another of the playback devices in the playback environment. For illustration purposes, the playback device may be the playback device 604, In one example, the first audio signal may be a test signal or measurement signal representative of audio content that may be played by the playback device during regular use by a user. Accordingly, the first audio signal may include audio content with frequencies substantially covering a renderable frequency range of the playback device 604 or a frequency range audible to a human. In one case, the first audio signal may be an audio signal created specifically for use when calibrating playback devices such as the playback device 604 being calibrated in examples discussed herein. In another case, the first audio signal may be an audio track that is a favorite of a user of the playback device 604, or a commonly played by the playback device 604. Other examples are also possible.

For illustration purposes, the network device may be the network device 602. As indicated previously, the network device 602 may be a mobile device with a built-in microphone. As such, the microphone of the network device may be a built-in microphone of the network device. In one example, prior to the network device 602 detecting the second audio signal via the microphone of the network device 602, the network device 602 may cause the playback device 804 to play the first audio signal. In one case, the network device 602 may transmit data indicating the first audio signal for the playback device 604 to play.

In another example, the playback device 604 may play the first audio signal in response to a command received from a server, such as the computing device 610, to play the first audio signal. In a further example, the playback device 604 may play the first audio signal without receiving a command from the network device 602 or computing device 610 For instance, if the playback device 604 is coordinating the calibration of the playback device 604, the playback device 604 may play the first audio signal without receiving a command to play the first audio signal.

Given that the second audio signal is detected by the microphone of the network device 602 while the first audio signal is being played by the playback device 604, the second audio signal may include a portion corresponding to the first audio signal. In other words, the second audio signal may include portions of the first audio signal as played by the playback device 604 and/or reflected within the playback environment 600.

In one example, the first physical location and the second physical location may both be within the playback environment 600. As shown in FIG. 6, the first physical location may be the point (a) and the second physical location may be the point (b). While moving from the first physical location (a) to the second physical location (b), the network device may traverse locations within the playback environment 600 where one or more listeners may experience audio playback during regular use of the playback device 604. In one example, the illustrative playback environment 600 may include a kitchen and dining room, and a path 608 between the first physical location (a) and the second physical location (b) covers locations within the kitchen and dining room where one or more listeners may experience audio playback during regular use of the playback device 604.

Given that the second audio signal is detected while the network device 602 is moving from the first physical location (a) to the second physical location (b), the second audio signal may include audio signals detected at different locations along the path 608 between the first physical location (a) and the second physical location (b). As such, a characteristic of the second audio signal may indicate that the second audio signal was detected while the network device 602 was moving from the first physical location (a) to the second physical location (b).

In one example, movement of the network device 602 between the first physical location (a) and the second physical location (b) may be performed by a user. In one case, prior to and/or during detection of the second audio signal, a graphical display of the network device may provide an indication to move the network device 602 within the playback devices. For instance, the graphical display may display text, such as "While audio is playing, please move the network device through locations within the playback zone where you or others may enjoy music." Other examples are also possible.

In one example, the first audio signal may be of a predetermined duration (around 30 seconds, for example), and detection of audio signals by the microphone of the network device 602 may be for the predetermined duration, or a similar duration. In one case, the graphical display of the network device may further provide an indication of an amount of time left for the user to move the network device 602 through locations within the playback environment 602. Other examples of the graphical display providing indications to aid the user during calibration of the playback device are also possible.

In one example, the playback device 604 and the network device 602 may coordinate playback of the first audio signal and/or detection of the second audio signal. In one case, upon initiation of the calibration, the playback device 604 may transmit a message to the network device indicating that the playback device 604 is, or is about to play the first audio signal, and the network device 602, in response to the message, may begin detection of the second audio signal. In another case, upon initiation of the calibration, the network device 602 may detect, using a motion sensor such as an accelerometer on the network device 602, movement of the network device 602, and transmit a message to the playback device 604 that the network device 602 has begun movement from the first physical location (a) to the second physical location (b). The playback device 604, in response to the message, may begin playing the first audio signal. Other examples are also possible.

At block 504, the method 500 involves based on the data indicating the second audio signal, identifying an audio processing algorithm. As indicated above, the second audio signal may include a portion corresponding to the first audio signal played by the playback device.

In one example, the second audio signal detected by the microphone of the network device 602 may be an analog signal. As such, the network device may process the detected analog signal (i.e. converting the detected audio signal from an analog signal to a digital signal) and generate data indicating the second audio signal.

In one case, the microphone of the network device 602 may have an acoustic characteristic that may factor into the audio signal outputted by the microphone to a processor of the network device 602 for processing (i.e. conversion to a digital audio signal). For instance, if the acoustic characteristic of the microphone of the network device involves a lower sensitivity at a particular frequency, audio content at the particular frequency may be attenuated in the audio signal outputted by the microphone.

Given that the audio signal outputted by the microphone of the network device 602 is represented as $x(t)$, the detected second audio signal is represented as $s(t)$, and the acoustic characteristic of the microphone is represented as $h_m(t)$, then a relationship between the signal outputted from the microphone and the second audio signal detected by the microphone may be:

$$x(t)=s(t) \otimes h_m(t) \quad (1)$$

where $\otimes$ represents the mathematical function of convolution. As such, the second audio signal s(t) as detected by the microphone may be determined based on the signal outputted from the microphone x(t) and the acoustic characteristic $h_m(t)$ of the microphone. For instance, a calibration algorithm, such as $h_m^{-1}(t)$ may be applied to the audio signal outputted from the microphone of the network device 602 to determine the second audio signal s(t) as detected by the microphone.

In one example, the acoustic characteristic $h_m(t)$ of the microphone of the network device 602 may be known. For instance, a database of microphone acoustic characteristics and corresponding network device models and or network device microphone models may be available. In another example, the acoustic characteristic $h_m(t)$ of the microphone of the network device 602 may be unknown. In such a case, the acoustic characteristic or microphone calibration algorithm of the microphone of the network device 602 may be determined using a playback device such as the playback device 604, the playback device 606, or another playback device. Examples of such a process may be found below in connection to FIGS. 9-11.

In one example, identifying the audio processing algorithm may involve determining, based on the first audio signal, a frequency response based on the data indicating the second audio signal and identifying based on the determined frequency response, an audio processing algorithm.

Given that the network device 602 is moving from the first physical location (a) to the second physical location (b) while the microphone of the network device 602 detects the second audio signal, the frequency response may include a series of frequency responses, each corresponding to portions of the second audio signal detected at different locations along the path 608. In one case, an average frequency response of the series of frequency responses may be determined. For instance, a signal magnitude at a particular frequency in the average frequency response may be an average of magnitudes at the particular frequency in the series of frequency responses. Other examples are also possible.

In one example, an audio processing algorithm may then be identified based on the average frequency response. In one case, the audio processing algorithm may be determined such that an application of the audio processing algorithm by the playback device 604 when playing the first audio signal in the playback environment 600 produces a third audio signal having an audio characteristic substantially the same as a predetermined audio characteristic.

In one example, the predetermined audio characteristic may be an audio frequency equalization that is considered good-sounding. In one case, the predetermined audio characteristic may involve an equalization that is substantially even across the renderable frequency range of the playback device. In another case, the predetermined audio characteristic may involve an equalization that is considered pleasing to a typical listener. In a further case, the predetermined audio characteristic may involve a frequency response that is considered suitable for a particular genre of music.

Whichever the case, the network device 602 may identify the audio processing algorithm based on the data indicating the second audio signal and the predetermined audio characteristic. In one example, if the frequency response of the playback environment 600 may be such that a particular audio frequency is more attenuated than other frequencies, and the predetermined audio characteristic involves an equalization in which the particular audio frequency is minimally attenuated, the corresponding audio processing algorithm may involve an increased amplification at the particular audio frequency.

In one example, a relationship between the first audio signal f(t) and the second audio signal as detected by the microphone of the network device 602, represented as s(t), may be mathematically described as:

$$s(t)=f(t) \otimes h_{pe}(t) \quad (2)$$

where $h_{pe}(t)$ represents an acoustic characteristic of audio content played by the playback device 604 the playback environment 600 (at the locations along the path 608). If the predetermined audio characteristic is represented as a predetermined audio signal z(t), and the audio processing algorithm is represented by p(t), a relationship between the predetermined audio signal z(t), the second audio signal s(t), and the audio processing algorithm p(t) may be mathematically described as:

$$z(t)=s(t) \times p(t) \quad (3)$$

Accordingly, the audio processing algorithm p(t) may be mathematically described as:

$$p(t)=z(t)/s(t) \quad (4)$$

In some cases, identifying the audio processing algorithm may involve the network device 602 sending to the computing device 610, the data indicating the second audio signal. In such a case, the computing device 610 may be configured to identify the audio processing algorithm based on the data indicating the second audio signal. The computing device 610 may identify the audio processing algorithm similarly to that discussed above in connection to equations 1-4. The network device 602 may then receive from the computing device 610, the identified audio processing algorithm.

At block 506, the method 500 involves transmitting to the playback device, data indicating the identified audio processing algorithm. The network device 602 may in some cases, also transmit to the playback device 604 a command to apply the identified audio processing algorithm when playing audio content in the playback environment 600.

In one example, the data indicating the identified audio processing algorithm may include one or more parameters for the identified audio processing algorithm. In another example, a database of audio processing algorithms may be accessible by the playback device. In such a case, the data indicating the identified audio processing algorithm may point to an entry in the database that corresponds to the identified audio processing algorithm.

In some cases, if at block 504, the computing device 610 identified the audio processing algorithm based on the data indicating the second audio signal, the computing device 610 may transmit the data indicating the audio processing algorithm directly to the playback device.

While the discussions above generally refer to calibration of a single playback device, one having ordinary skill in the art will appreciate that similar functions may also be performed to calibrate a plurality of playback devices, either individually or as a group. For instance, method 500 may further be performed by playback device 604 and/or 606 to calibrate playback device 606 for the playback environment 600. In one example, playback device 604 may be calibrated for synchronous playback with playback device 606 in the playback environment. For instance, playback device 604 may cause playback device 606 to play a third audio signal, either in synchrony with or individually from playback of the first audio signal by the playback device 604.

In one example, the first audio signal and the third audio signal may be substantially the same and/or played concurrently. In another example, the first audio signal and the third audio signal may be orthogonal, or otherwise discernable. For instance, the playback device 604 may play the first audio signal after playback of the third audio signal by the playback device 606 is completed. In another instance, the first audio signal may have a phase that is orthogonal to a phase of the third audio signal. In yet another instance, the third audio signal may have a different and/or varying frequency range than the first audio signal. Other examples are also possible.

Whichever the case, the second audio signal detected by the microphone of the network device 602 may further include a portion corresponding to the third audio signal played by a second playback device. As discussed above, the second audio signal may then be processed to identify the audio processing algorithm for the playback device 604, as well as an audio processing algorithm for the playback device 606. In this case, one or more additional functions involving parsing the different contributions to the second audio signal by the playback device 604 and the playback device 606 may be performed In example, a first audio processing algorithm may be identified for the playback device 604 to apply when playing audio content in the playback environment 600 by itself and a second audio processing algorithm may be identified for the playback device 604 to apply when playing audio content in synchrony with the playback device 606 in the playback environment 600. The playback device 604 may then apply the appropriate audio processing algorithm based on the playback configuration the playback device 604 is in. Other examples are also possible.

In one example, upon initially identifying the audio processing algorithm, the playback device 604 may apply the audio processing algorithm when playing audio content. The user of the playback device (who may have initiated and participated in the calibration) may decide after listening to the audio content played with the audio processing algorithm applied, whether to save the identified audio processing algorithm, discard the audio processing algorithm, and/or perform the calibration again.

In some cases, the user may for a certain period of time, activate or deactivate the identified audio processing algorithm. In one instance, this may allow the user more time to evaluate whether to have the playback device 604 apply the audio processing algorithm, or perform the calibration again. If the user indicates that the audio processing algorithm should be applied, the playback device 604 may apply the audio processing algorithm by default when the playback device 604 plays media content. The audio processing algorithm may further be stored on the network device 604, the playback device 604, the playback device 606, the computing device 610, or any other device in communication with the playback device 604. Other examples are also possible.

As indicated above, method 500 may be coordinated and/or performed at least in part by the network device 602. Nevertheless, in some embodiments, some functions of the method 500 may be performed and/or coordinated by one or more other devices, including the playback device 604, the playback device 606, or the computing device 610, among other possibilities. For instance, as indicated above, block 502 may be performed by the network device 602, while in some cases, block 504 may be performed in part by the computing device 610, and block 506 may be performed by the network device 602 and/or the computing device 610. Other examples are also possible.

b. Second Example Method for Calibrating One or More Playback Devices

Figure 7:
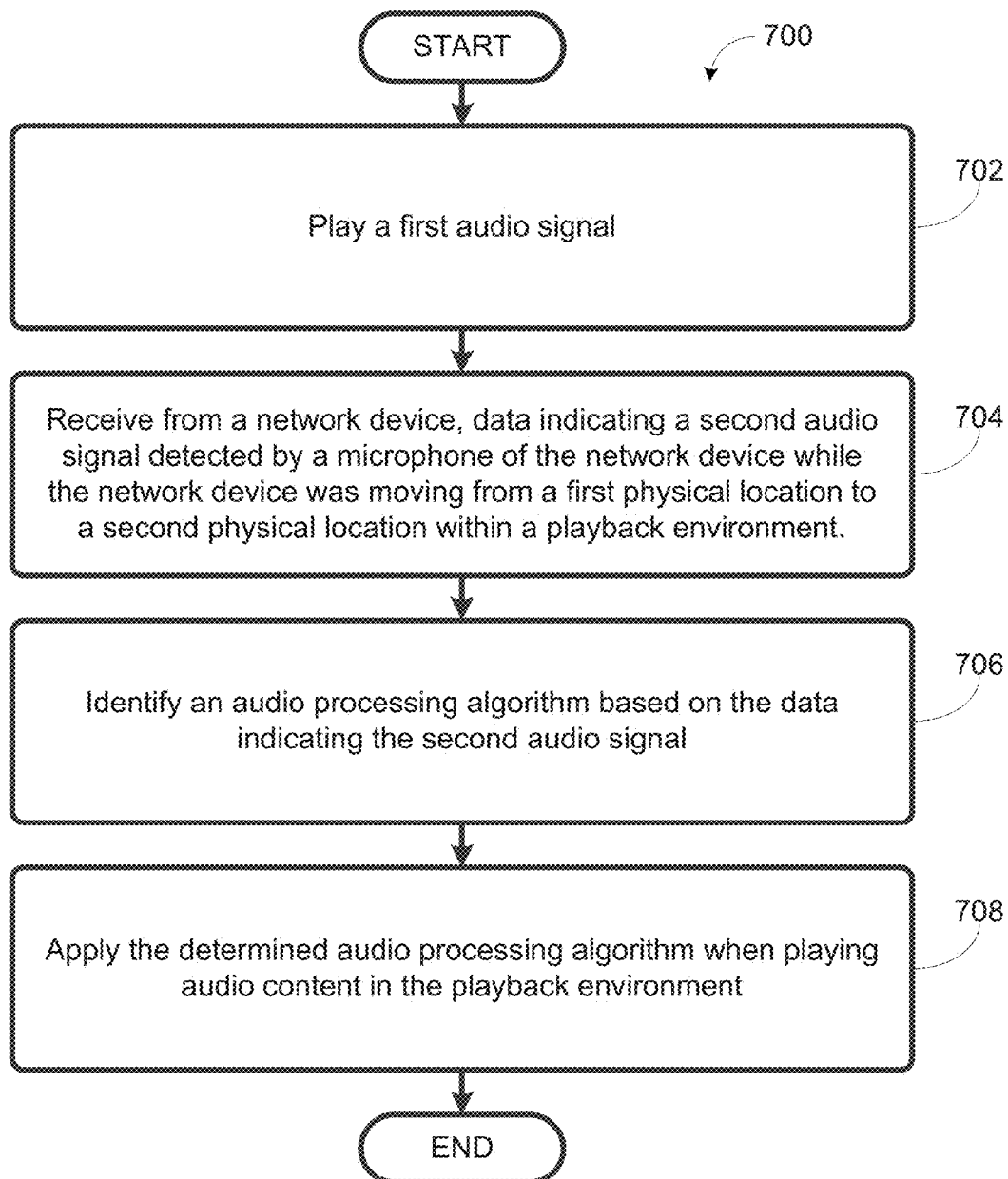
FIG. 7 shows an example flow diagram of a second method for calibrating a playback device

FIG. 7 shows an example flow diagram of a second method 700 for calibrating a playback device based on an audio signal detected by a microphone of a network device moving about within a playback environment. Method 700 shown in FIG. 7 presents an embodiment of a method that can be implemented within an operating environment involving, for example, the media playback system 100 of FIG. 1, one or more of the playback device 200 of FIG. 2, one or more of the control device 300 of FIG. 3, and the playback environment 600 of FIG. 6, which will be discussed below. Method 700 may include one or more operations, functions, or actions as illustrated by one or more of blocks 702-708. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In one example, method 700 may be coordinated and/or performed at least in part by the playback device being calibrated. As shown in FIG. 7, the method 700 involves playing a first audio signal at block 702; receiving from a network device, data indicating a second audio signal detected by a microphone of the network device while the network device was moving from a first physical location to a second physical location at block 704; identifying an audio processing algorithm based on the data indicating the second audio signal at block 706; and applying the identified audio processing algorithm when playing audio content in the playback environment at block 708.

At block 702, the method 700 involves the playback device playing a first audio signal. Referring again to FIG. 600, the playback device performing at least a part of the method 700 may be the playback device 604. As such, the playback device 604 may play the first audio signal. Further, the playback device 604 may play the first audio signal with or without a command to play the first audio signal from the network device 602, the computing device 610, or the playback device 606.

In one example, the first audio signal may be substantially similar to the first audio signal discussed above in connection to block 502. As such, any discussion of the first audio signal in connection to the method 500 may also be applicable to the first audio signal discussed in connection to block 702 and the method 700.

At block 704, the method 700 involves receiving from a network device, data indicating a second audio signal detected by a microphone of the network device while the network device was moving from a first physical location to a second physical location. In addition to indicating the second audio signal, the data may further indicate that the second audio signal was detected by the microphone of the network device while the network device was moving from the first physical location to the second physical location. In one example, block 704 may be substantially similar to block 502 of the method 500. As such, any discussions relating to block 502 and method 500 may also be applicable, sometimes with modifications, to block 704.

In one case, the playback device 604 may receive the data indicating the second audio signal while the microphone of the network device 602 detects the second audio signal. In other words, the network device 602 may stream the data indicating the second audio signal while detecting the second audio signal. In another case, the playback device 604 may receive the data indicating the second audio signal once detection of the second audio signal (and in some cases, playback of the first audio signal by the playback device 604) is complete. Other examples are also possible.

At block 706, the method 700 involves identifying an audio processing algorithm based on the data indicating the second audio signal. In one example, block 706 may be substantially similar to block 504 of the method 500. As such, any discussions relating to block 504 and method 500 may also be applicable, sometimes with modifications, to block 706.

At block 708, the method 700 involves applying the identified audio processing algorithm when playing audio content in the playback environment. In one example, block 708 may be substantially similar to block 506 of the method 500. As such, any discussions relating to block 506 and method 500 may also be applicable, sometimes with modifications, to block 708. In this case, however, the playback device 604 may apply the identified audio processing algorithm without necessarily transmitting the identified audio processing algorithm to another device. As indicated before, the playback device 604 may nevertheless transmit the identified audio processing algorithm to another device, such as the computing device 610, for storage.

As indicated above, method 700 may be coordinated and/or performed at least in part by the playback device 604. Nevertheless, in some embodiments, some functions of the method 700 may be performed and/or coordinated by one or more another devices including the network device 602, the playback device 606, or the computing device 610, among other possibilities. For instance, blocks 702, 704, and 708 may be performed by the playback device 604, while in some cases, block 706 may be performed in part by the network device 602 or the computing device 610. Other examples are also possible.

c. Third Example Method for Calibrating One or More Playback Devices

Figure 8:
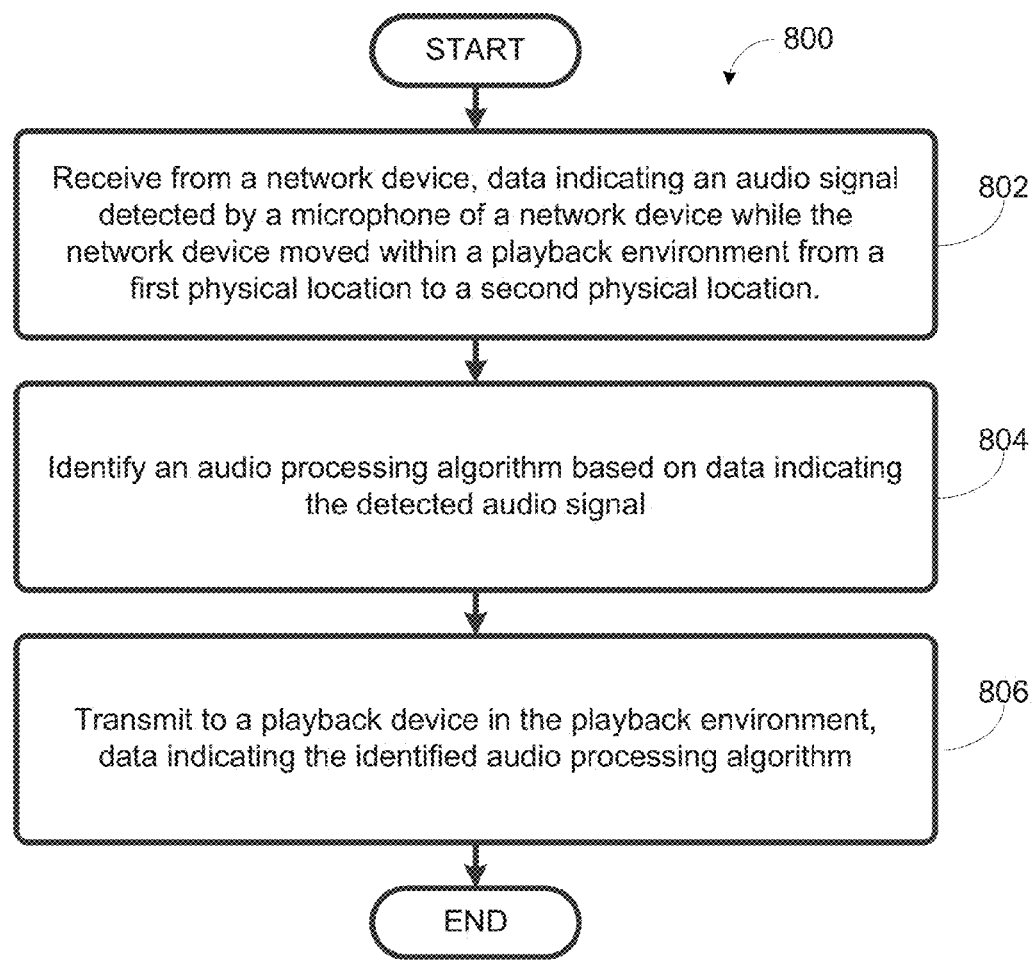
FIG. 8 shows an example flow diagram of a third method for calibrating a playback device

FIG. 8 shows an example flow diagram of a third method 800 for calibrating a playback device based on an audio signal detected by a microphone of a network device moving about within a playback environment. Method 800 shown in FIG. 8 presents an embodiment of a method that can be implemented within an operating environment involving, for example, the media playback system 100 of FIG. 1, one or more of the playback device 200 of FIG. 2, one or more of the control device 300 of FIG. 3, and the playback environment 600 of FIG. 6, which will be discussed below. Method 800 may include one or more operations, functions, or actions as illustrated by one or more of blocks 802-806. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In one example, method 800 may be performed at least in part by a computing device, such a server in communication with the playback device. Referring again to the playback environment 600 of FIG. 6, method 800 may be coordinated and/or performed at least in part by the computing device 610.

As shown in FIG. 8, the method 800 involves receiving from a network device, data indicating an audio signal detected by a microphone of a network device while the network device moved within a playback environment from a first physical location to a second physical location at block 802; identifying an audio processing algorithm based on data indicating the detected audio signal at block 804; and transmitting to a playback device in the playback environment, data indicating the identified audio processing algorithm at block 806.

At block 802, the method 800 involves receiving from a network device, data indicating an audio signal detected by a microphone of a network device while the network device moved within a playback environment from a first physical location to a second physical location. In addition to indicating the detected audio signal, the data may further indicate that the detected audio signal was detected by the microphone of the network device while the network device was moving from the first physical location to the second physical location. In one example, block 802 may be substantially similar to block 502 of the method 500 and block 704 of the method 700. As such, any discussions relating to block 502 and method 500, or block 704 and method 700 may also be applicable, sometimes with modifications, to block 802.

At block 804, the method 800 involves identifying an audio processing algorithm based on data indicating the detected audio signal. In one example, block 804 may be substantially similar to block 504 of the method 500 and block 706 of the method 700. As such, any discussions relating to block 504 and method 500, or block 706 and method 700 may also be applicable, sometimes with modifications, to block 804.

At block 806, the method 800 involves transmitting to a playback device in the playback environment, data indicating the identified audio processing algorithm at block 806. In one example, block 806 may be substantially similar to block 506 of the method 500 and block 708 of the method 700. As such, any discussions relating to block 504 and method 500, or block 708 and method 700 may also be applicable, sometimes with modifications, to block 806.

As indicated above, method 800 may be coordinated and/or performed at least in part by the computing device 610. Nevertheless, in some embodiments, some functions of the method 800 may be performed and/or coordinated by one or more other devices, including the network device 602, the playback device 604, or the playback device 606, among other possibilities. For instance, as indicated above, block 802 may be performed by the computing device, while in some cases, block 804 may be performed in part by the network device 602, and block 806 may be performed by the computing device 610 and/or the network device 602. Other examples are also possible.

In some cases, two more network devices may be used to calibrate one or more playback devices, either individually or collectively. For instance, two or more network devices may detect audio signals played by the one or more playback devices while moving about a playback environment. For instance, one network device may move about where a first user regularly listens to audio content played by the one or more playback devices, while another network device may move about where a second user regularly listens to audio content played by the one or more playback devices. In such a case, a processing algorithm may be performed based on the audio signals detected by the two or more network devices.

Further, in some cases, a processing algorithm may be performed for each of the two or more network devices based on signals detected while each respective network device traverses different paths within the playback environment. As such, if a particular network device is used to initiate playback of audio content by the one or more playback devices, a processing algorithm determined based on audio signals detected while the particular network device traversed the playback environment may be applied. Other examples are also possible.

IV. Calibration of a Network Device Microphone Using a Playback Device Microphone As indicated above, calibration of a playback device for a playback environment, as discussed above in connection to FIG. 5-8 may involve knowledge of an acoustic characteristic and/or calibration algorithm of the microphone of the network device used for the calibration. In some cases however, the acoustic characteristic and/or calibration algorithm of the microphone of the network device used for calibration may be unknown Examples discussed in this section involve calibrations of a microphone of a network device based on an audio signal detected by the microphone of the network device while the network device is positioned within a predetermined physical range of a microphone of a playback device. Methods 900 and 1100, as will be discussed below are example methods that may be performed to calibrate the network device microphone.

a. First Example Method for Calibrating a Network Device Microphone

Figure 9:
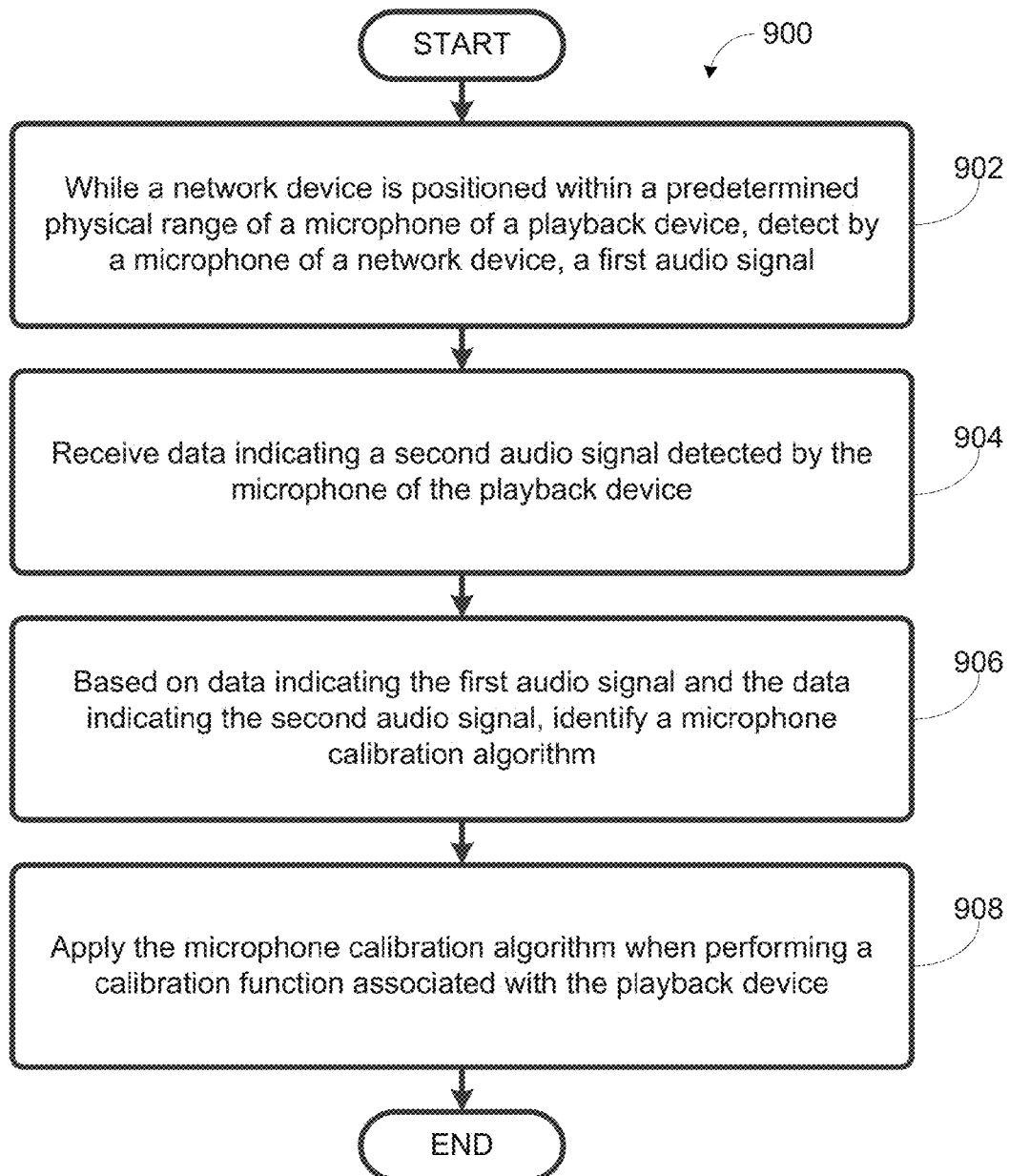
FIG. 9 shows an example flow diagram of a first method for calibrating a microphone.

FIG. 9 shows an example flow diagram of a first method for calibrating a network device microphone. Method 900 shown in FIG. 9 presents an embodiment of a method that can be implemented within an operating environment involving, for example, the media playback system 100 of FIG. 1, one or more of the playback device 200 of FIG. 2, one or more of the control device 300 of FIG. 3, as well as the example arrangement 1000 for microphone calibration shown in FIG. 10, which will be discussed below. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In one example, method 900 may be performed at least in part by the network device for which a microphone is being calibrated. As shown in FIG. 9, the method 900 involves while the network device is positioned within a predetermined physical range of a microphone of a playback device, detecting by a microphone of the network device, a first audio signal at block 902; receiving data indicating a second audio signal detected by the microphone of the playback device at block 904; based on data indicating the first audio signal and the data indicating the second audio signal, identifying a microphone calibration algorithm at block 906; and applying the microphone calibration when performing a calibration function associated with the playback device at block 908.

Figure 10:
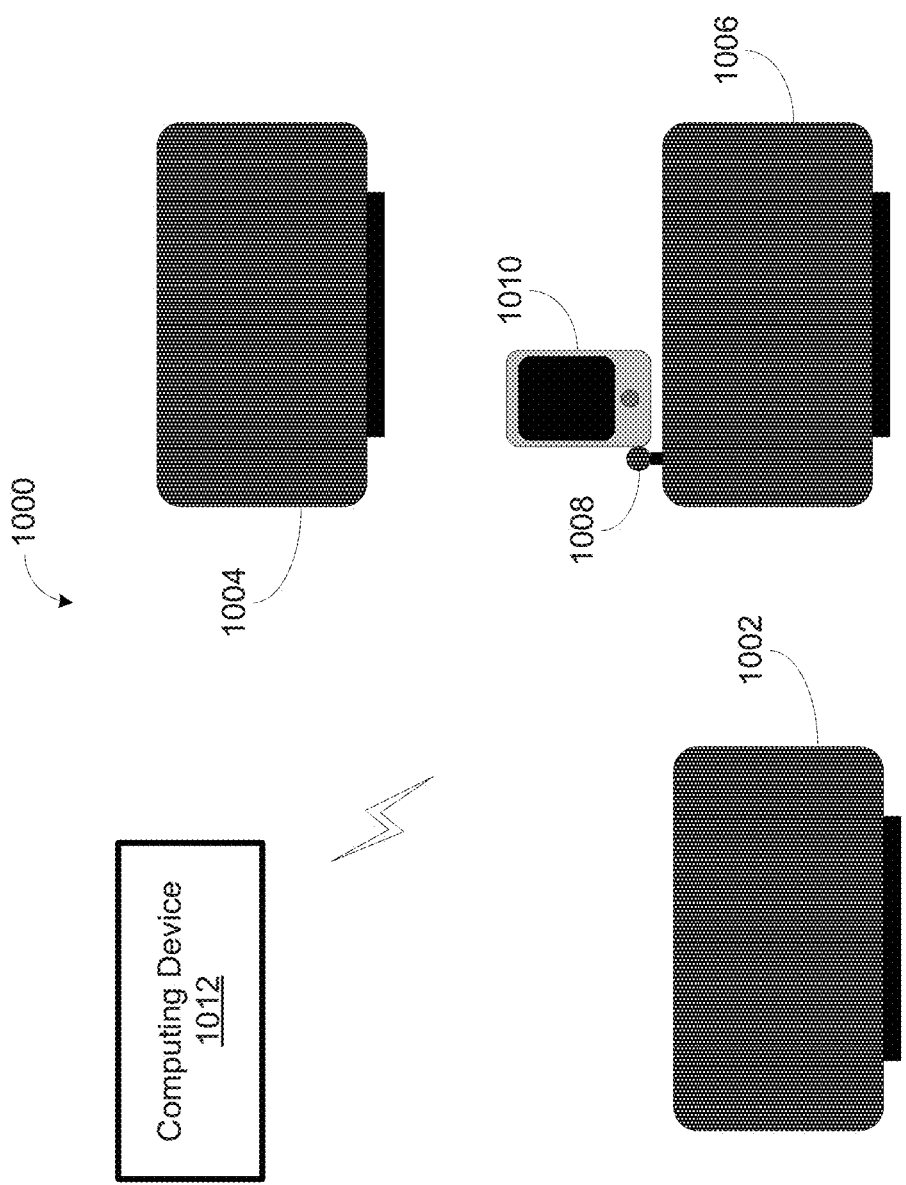
FIG. 10 shows an example arrangement for microphone calibration.

To aid in illustrating method 900, as well as method 1100 below, an example arrangement for microphone calibration 1000 as shown in FIG. 10 is provided. The microphone calibration arrangement 1000 includes playback device 1002, playback device 1004, playback device 1006, a microphone 1008 of the playback device 1006, a network device 1010, and a computing device 1012.

The network device 1010, which may coordinate and/or perform at least a portion of the method 900 may be similar to the control device 300 of FIG. 3. In this case, the network device 1010 may have a microphone that is to be calibrated according to method 900 and/or method 1100. As indicated above, the network device 1010 may be a mobile device with a built-in microphone. As such, the microphone of the network device 1010 to be calibrated may be a built-in microphone of the network device 1010.

The playback devices 1002, 1004, and 1006 may each be similar to the playback device 200 of FIG. 2. One or more of the playback devices 1002, 1004, and 1006 may have a microphone (with a known acoustic characteristic). The computing device 1012 may be a server in communication with a media playback system that includes the playback devices 1002, 1004, and 1006. The computing device 1012 may further be in communication, either directly or indirectly with the network device 1010. While the discussions below in connection to methods 900 and 1100 may refer to the microphone calibration arrangement 1000 of FIG. 10, one having ordinary skill in the art will appreciate that the microphone calibration arrangement 1000 as shown is only one example of microphone calibration arrangement within which a network device microphone may be calibrated. Other examples are also possible.

In one example, the microphone calibration arrangement 1000 may be within an acoustic test facility where network device microphones are calibrated. In another example, the microphone calibration arrangement 1000 may be in a user household where the user may use the network device 1010 to calibrate the playback devices 1002, 1004, and 1006.

In one example, calibration of the microphone of the network device 1010 may be initiated by the network device 1010 or the computing device 1012. For instance, calibration of the microphone may be initiated when an audio signal detected by the microphone is being processed by either the network device 1010 or the computing device 1012, such as for a calibration of a playback device as described above in connection to methods 500, 700, and 800, but an acoustic characteristic of the microphone is unknown. In another example, calibration of the microphone may be initiated when the network device 1010 receives an input indicating that the microphone of the network device 1010 is to be calibrated. In one case, the input may be provided by a user of the network device 1010.

Referring back to method 900, block 902 involves while the network device is positioned within a predetermined physical range of a microphone of a playback device, detecting by a microphone of the network device, a first audio signal. Referring to the microphone calibration arrangement 1000, the network device 1010 may be within a predetermined physical range of the microphone 1008 of the playback device 1006. The microphone 1008, as illustrated, may be at an upper left position of the playback device 1006. In implementation, the microphone 1008 of the playback device 1006 may be positioned at a number of possible positions relative to the playback device 1006. In one case, the microphone 1008 may be hidden within the playback device 1006 and invisible from outside the playback device 1006.

As such, depending on the location of the microphone 1008 of the playback device 1006, the position within the predetermined physical range of the microphone 1008 of the playback device 1006 may be one of a position above the playback device 1006, a position behind the playback device 1006, a position to a side of the playback device 1006, or a position in front of the playback device 1006, among other possibilities.

In one example, the network device 1010 may be positioned within the predetermined physical range of the microphone 1008 of the playback device by a user as part of the calibration process. For instance, upon initiation of the calibration of the microphone of the network device 1010, the network device 1010 may provide on a graphical display of the network device 1010, a graphical interface indicating that the network device 1010 is to be positioned within the predetermined physical range of the microphone of a playback device with known microphone acoustic characteristics, such as the playback device 1006. In one case, if multiple playback devices controlled by the network device 1010 has a microphone with known acoustic characteristics, the graphical interface may prompt the user to select from the multiple playback devices, a playback device to use for the calibration. In this example, the user may have selected the playback device 1006. In one example, the graphical interface may include a diagram of where the predetermined physical range of the microphone of the playback device 1006 is relative to the playback device 1006.

In one example, the first audio signal detected by the microphone of the network device 1010 may include a portion corresponding to a third audio signal played by one or more of the playback devices 1002, 1004, and 1006. In other words, the detected first audio signal may include portions of the third audio signal played by one or more of the playback devices 1002, 1004, and 1006, as well as portions of the third audio signal that is reflected within a room within which the microphone calibration arrangement 1000 is setup, among other possibilities.

In one example, the third audio signal played by the one or more playback devices 1002, 1004, and 1006 may be a test signal or measurement signal representative of audio content that may be played by the playback devices 1002, 1004, and 1006 during calibration of one or more of the playback devices 1002, 1004, and 1006. Accordingly, the played third audio signal may include audio content with frequencies substantially covering a renderable frequency range of the playback devices 1002, 1004, and 1006 or a frequency range audible to a human. In one case, the played third audio signal may be an audio signal created specifically for use when calibrating playback devices such as the playback devices 1002, 1004, and 1006. Other examples are also possible.

The third audio signal may be played by one or more of the playback device 1002, 1004, and 1006 once the network device 1010 is in the predetermined position. For instance, once the network device 1010 is within the predetermined physical range of the microphone 1008, the network device 1010 may transmit a message to one or more of the playback device 1002, 1004, and 1006 to cause the one or more playback devices 1002, 1004 and 1006 to play the third audio signal. In one case, the message may be transmitted in response to an input by the user indicating that the network device 1010 is within the predetermined physical range of the microphone 1008. In another case, the network device 1010 may detect a proximity of the playback device 1006 to the network device 1010 based on proximity sensors on the network device 1010. In another example, the playback device 1006 may determine when the network device 1010 is positioned within the predetermined physical range of the microphone 1008 based on proximity sensors on the playback device 1006. Other examples are also possible.

One or more of the playback devices 1002, 1004, and 1006 may then play the third audio signal, and the first audio signal may be detected by the microphone of the network device 1010.

At block 904, the method 900 involves receiving data indicating a second audio signal detected by the microphone of the playback device. Continuing with the example above, the microphone of the playback device may be the microphone 1008 of the playback device 1006. In one example, the second audio signal may be detected by the microphone 1008 of the playback device 1006 at the same time the microphone of the network device 1010 detected the first audio signal. As such, the second audio signal may also include a portion corresponding to the third audio signal played by one or more of the playback device 1002, 1004, and 1006 as well as portions of the third audio signal that is reflected within a room within which the microphone calibration arrangement 1000 is setup, among other possibilities.

In another example, the second audio signal may be detected by the microphone 1008 of the playback device 1006 before or after the first audio signal was detected. In such a case, one or more of the playback devices 1002, 1004, and 1006 may play the third audio signal, or an audio signal substantially the same as the third audio signal at a different time, during which the microphone 1008 of the playback device 1006 may detect the second audio signal.

In such a case, the one or more of the playback devices 1002, 1004, and 1006 may be in the same exact microphone calibration arrangement 1000 when the third audio signal is played, and when the second audio signal is detected by the microphone 1008 of the playback device 1006.

In one example, the network device 1010 may receive the data indicating the second audio signal while the second audio signal is being detected by the microphone 1008 of the playback device 1006. In other words, the playback device 1006 may stream the data indicating the second audio signal to the network device 1010 while the microphone 1008 is detecting the second audio signal. In another example, the network device 1010 may receive the data indicating the second audio signal after the detection of the second audio signal is complete. Other examples are also possible.

At block 906, the method involves based on data indicating the first audio signal and the data indicating the second audio signal, identifying a microphone calibration algorithm. In one example, positioning the network device 1010 within the predetermined physical range of the microphone 1008 of the playback device 1006 may result in the first audio signal detected by the microphone of the network device 1010 to be substantially the same as the second audio signal detected by the microphone 1008 of the playback device 1006. As such, given that the acoustic characteristic of the playback device 1006 is known, an acoustic characteristic of the microphone of the network device 1010 may be determined.

Given that the second audio signal detected by the microphone 1008 is s(t), and an acoustic characteristic of the microphone 1008 is $h_p(t)$, then a signal m(t) outputted from the microphone 1008 and processed to generate the data indicating the second audio signal may be mathematically represented as:

$$m(t)=s(t)\otimes h_p(t) \qquad (5)$$

Analogously, given that the first audio signal detected by the microphone of the network device 1010 is f(t) and the unknown acoustic characteristic of the microphone of the network device 1010 is $h_n(t)$, then a signal n(t) outputted from the microphone of the network device 1010 and processed to generate the data indicating the first audio signal may be mathematically represented as:

$$n(t)=f(t)\otimes h_n(t) \qquad (6)$$

Assuming, as discussed above, that the first audio signal f(t) detected by the microphone of the network device 1010 is substantially the same as the second audio signal s(t) detected by the microphone 1008 of the playback device 1006, $$m(t) \otimes h_p^{-1}(t) = n(t) \otimes h_n^{-1}(t) \qquad (7)$$

Accordingly, since the data indicating the first audio signal n(t), the data indicating the second audio signal m(t), and the acoustic characteristic of the microphone 1008 of the playback device 1006 $h_p(t)$ are known, $h_n(t)$ may be calculated.

In one example, a microphone calibration algorithm for the microphone of the network device 1010 may simply be the inverse of the acoustic characteristic $h_n(t)$, represented as $h_n^{-1}(t)$. As such, an application of the microphone calibration algorithm when processing audio signals outputted by the microphone of the network device 1010 may mathematically remove the acoustic characteristic of the microphone of the network device 1010 from the outputted audio signal. Other examples are also possible.

In some cases, identifying the microphone calibration algorithm may involve the network device 1010 sending to the computing device 1012, the data indicating the first audio signal, the data indicating the second audio signal, and the acoustic characteristic of the microphone 1008 of the playback device 1006. In one case, the data indicating the second audio signal and the acoustic characteristic of the microphone 1008 of the playback device 1006 may be provided to the computing device 1012 from the playback device 1006 and/or another device in communication with the computing device 1012. The computing device 1012 may then identify the audio processing algorithm based on the data indicating the first audio signal, the data indicating the second audio signal, and the acoustic characteristic of the microphone 1008 of the playback device 1006, similarly to that discuss above in connection to equations 5-7. The network device 1010 may then receive from the computing device 1012, the identified audio processing algorithm.

At block 906, the method 900 involves applying the microphone calibration algorithm when performing a calibration function associated with the playback device. In one example, upon identifying the microphone calibration algorithm, the network device 1010 may apply the identified microphone calibration algorithm when performing functions involving the microphone. For instance, a particular audio signal originating from an audio signal detected by the microphone of the network device 1010 may be processed using the microphone calibration algorithm to mathematically remove the acoustic characteristic of the microphone from the audio signal, before the network device 1010 transmits data indicating the particular audio signal to another device. In one example, the microphone calibration algorithm may be applied when the network device 1010 is performing a calibration of a playback device, as described above in connection to methods 500, 700, and 800.

In one example, the network device 1010 may further store in a database, an association between the identified calibration algorithm (and/or acoustic characteristic) and one or more characteristics of the microphone of the network device 1010. The one or more characteristics of the microphone of the network device 1010 may include a model of the network device 1010, or a model of the microphone of the network device 1010, among other possibilities. In one example, the database may be stored locally on the network device 1010. In another example, the database may be transmitted to and stored on another device, such as the computing device 1012, or any one or more of the playback devices 1002, 1004, and 1006. Other examples are also possible.

The database may be populated with multiple entries of microphone calibration algorithms and/or associations between microphone calibration algorithms and one or more characteristics of microphones of network devices. As indicated above, the microphone calibration arrangement 1000 may be within an acoustic test facility where network device microphones are calibrated. In such a case, the database may be populated via the calibrations within the acoustic test facility. In the case the microphone calibration arrangement 1000 is in a user household where the user may use the network device 1010 to calibrate the playback devices 1002, 1004, and 1006, the database may be populated with crowd-sourced microphone calibration algorithms. In some cases, the database may include entries generated from calibrations in the acoustic test facility as well as crowd-sourced entries.

The database may be accessed by other network devices, computing devices including the computing device 1012, and playback devices including the playback device 1002, 1004, and 1006 to identify an audio processing algorithm corresponding to a particular network device microphone to apply when processing audio signals outputted from the particular network device microphone.

In some cases, due to variations in production and manufacturing quality control of the microphones, and variations during calibrations (i.e. potential inconsistencies in where the network devices are positioned during calibration, among other possibilities), the microphone calibration algorithms determined for the same model of network device or microphone vary. In such a case, a representative microphone calibration algorithm may be determined from the varying microphone calibration algorithm. For instance, the representative microphone calibration algorithm may be an average of the varying microphone calibration algorithms. In one case, an entry in the database for a particular model of network device may be updated with an updated representative calibration algorithm each time a calibration is performed for a microphone of the particular model of network device.

As indicated above, method 900 may be coordinated and/or performed at least in part by the network device 1010. Nevertheless, in some embodiments, some functions of the method 900 may be performed and/or coordinated by one or more other devices, including one or more of the playback devices 1002, 1004, and 1006, or the computing device 1012, among other possibilities. For instance, blocks 902 and 908 may be performed by the network device 1010, while in some cases, blocks 904 and 906 may be performed at least in part by the computing device 1012. Other examples are also possible.

In some cases, the network device 1010 may further coordinate and/or perform at least a portion of functions for calibrating a microphone of another network device. Other examples are also possible.

b. Second Example Method for Calibrating a Network Device Microphone

Figure 11:
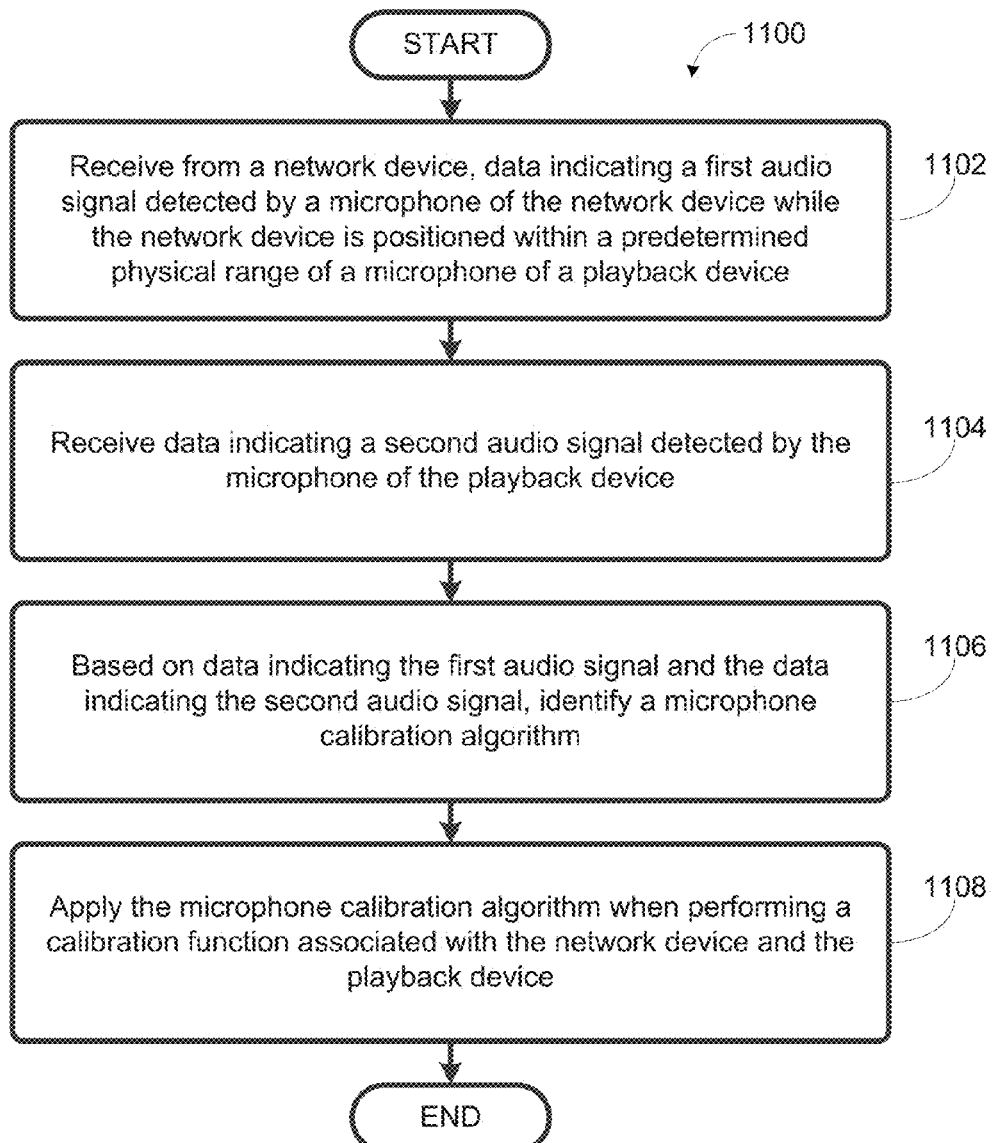
FIG. 11 shows an example flow diagram of a second method for calibrating a microphone.

FIG. 11 shows an example flow diagram of a second method for calibrating a network device microphone. Method 1100 shown in FIG. 11 presents an embodiment of a method that can be implemented within an operating environment involving, for example, the media playback system 100 of FIG. 1, one or more of the playback device 200 of FIG. 2, one or more of the control device 300 of FIG. 3, as well as the example arrangement 1000 for microphone calibration shown in FIG. 10. Method 1100 may include one or more operations, functions, or actions as illustrated by one or more of blocks 1102-1108. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In one example, method 1100 may be performed at least in part by a computing device, such as the computing device 1012 of FIG. 10. As shown in FIG. 11, the method 1100 involves receiving from a network device, data indicating a first audio signal detected by a microphone of the network device while the network device is positioned within a predetermined physical range of a microphone of a playback device at block 1102; receiving data indicating a second audio signal detected by the microphone of the playback device at block 1104; based on data indicating the first audio signal and the data indicating the second audio signal, identifying a microphone calibration algorithm at block 1106; and applying the microphone calibration algorithm when performing a calibration function associated with the network device and the playback device at block 1108.

At block 1102, the method 1100 involves receiving from a network device, data indicating a first audio signal detected by a microphone of the network device while the network device is positioned within a predetermined physical range of a microphone of a playback device. The data indicating the first audio signal may further indicate that the first audio signal was detected by the microphone of the network device while the network device is positioned within the predetermined physical range of the microphone of the playback device. In one example, block 1102 of the method 1100 may be substantially similar to block 902 of the method 900, except coordinated and/or performed by the computing device 1012 instead of the network device 1010. Nevertheless, any discussion relating to block 902 and the method 900 may also be applicable, sometimes with modifications, to block 1102.

At block 1104, the method 1100 involves receiving data indicating a second audio signal detected by the microphone of the playback device. In one example, block 1104 of the method 1100 may be substantially similar to block 904 of the method 900, except coordinated and/or performed by the computing device 1012 instead of the network device 1010. Nevertheless, any discussion relating to block 904 and the method 900 may also be applicable, sometimes with modifications, to block 1104.

At block 1106, the method 1100 involves based on data indicating the first audio signal and the data indicating the second audio signal, identifying a microphone calibration algorithm. In one example, block 1106 of the method 1100 may be substantially similar to block 906 of the method 900, except coordinated and/or performed by the computing device 1012 instead of the network device 1010. Nevertheless, any discussion relating to block 906 and the method 900 may also be applicable, sometimes with modifications, to block 1106.

At block 1108, the method 1100 involves applying the microphone calibration algorithm when performing a calibration function associated with the network device and the playback device. In one example, block 1108 of the method 1100 may be substantially similar to block 908 of the method 900, except coordinated and/or performed by the computing device 1012 instead of the network device 1010. Nevertheless, any discussion relating to block 906 and the method 900 may also be applicable, sometimes with modifications, to block 1106.

For instance, in this case, the microphone calibration algorithm may be applied to microphone-detected audio signal data received by the computing device 1012 from a respective network device, rather than applied by the respective network device before the microphone-detected audio signal data is transmitted to, and received by the computing device 1012. In some cases, the computing device 1012 may identify the respective network device sending the microphone-detected audio signal data, and applying a corresponding microphone calibration algorithm to the data received from the respective network device.

As described in connection to the method 900, the microphone calibration algorithm identified at block 1108 may also be stored in a database of microphone calibration algorithms and/or associations between microphone calibration algorithms and one or more characteristics of respective network devices and/or network device microphones.

The computing device 1012 may also be configured to coordinate and/or perform functions to calibrate microphones of other network devices. For instance, the method 1100 may further involve receiving from a second network device, data indicating an audio signal detected by a microphone of the second network device while the second network device is positioned within the predetermined physical range of the microphone of the playback device. The data indicating the detected audio signal may also indicate that the detected audio signal was detected by the microphone of the second network device while the second network device was positioned within the predetermined physical range of the microphone of the playback device.

Based on the data indicating the detected audio signal and the data indicating the second audio signal, identifying a second microphone calibration algorithm, and causing for storage in a database, an association between the determined second microphone calibration algorithm and one or more characteristics of the microphone of the second network device. The computing device 1012 may further transmit to the second network device, data indicating the second microphone calibration algorithm.

As also described in connection to the method 900, due to variations in production and manufacturing quality control of the microphones, and variations during calibrations (i.e. potential inconsistencies in where the network devices are positioned during calibration, among other possibilities), the microphone calibration algorithms determined for the same model of network device or microphone vary. In such a case, a representative microphone calibration algorithm may be determined from the varying microphone calibration algorithm. For instance, the representative microphone calibration algorithm may be an average of the varying microphone calibration algorithms. In one case, an entry in the database for a particular model of network device may be updated with an updated representative microphone calibration algorithm each time a calibration is performed for a microphone of the particular model of network device device.

In one such case, for instance, if the second network device is of a same model as the network device 1010 and have the same model microphone, the method 1100 may further involve determining that the microphone of the network device 1010 and the microphone of the second network device are substantially the same, responsively determining a third microphone calibration algorithm based on the first microphone calibration algorithm (for the microphone of the network device 1010) and the second microphone calibration algorithm and causing for storage in the database, an association between the determined third microphone calibration algorithm and one or more characteristics of the microphone of the network device 1010. As indicated above, the third microphone calibration algorithm may be determined as an average between the first microphone calibration algorithm and the second microphone calibration algorithm.

As indicated above, method 1100 may be coordinated and/or performed at least in part by the computing device 1012. Nevertheless, in some embodiments, some functions of the method 1100 may be performed and/or coordinated by one or more other devices, including the network device 1010, and one or more of the playback devices 1002, 1004, and 1006, among other possibilities. For instance, as indicated above, block 1102-1106 may be performed by the computing device 1012, while in some cases block 1108 may be performed by the network device 1010. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A network device comprising: a microphone; one or more processors; and a non-transitory computer-readable memory having stored thereon instructions executable by the one or more processors to cause the network device to perform functions comprising: while the network device is positioned within a predetermined physical range of a microphone of a playback device, detecting by the microphone of the network device, a first audio signal; receiving data indicating a second audio signal detected by the microphone of the playback device; based on (i) data indicating the first audio signal, (ii) the data indicating the second audio signal, and (iii) an acoustic characteristic of the microphone of the playback device, determining an acoustic characteristic of the microphone of the network device; generating a microphone calibration algorithm based on the determined acoustic characteristic of the microphone of the network device; and applying the microphone calibration algorithm when performing an acoustic calibration of the playback device.

2. The network device of claim 1, wherein the functions further comprise:
   causing for storage in a database, an association between the generated microphone calibration algorithm and one or more characteristics of the microphone of the network device.

3. The network device of claim 1, wherein the second audio signal was detected by the microphone of the playback device while the first audio signal was detected by the microphone of the network device.

4. The network device of claim 1, further comprising:
   while detecting the first audio signal, causing one or more playback devices to play a third audio signal, wherein the first audio signal and the second audio signal each comprise a portion corresponding to the third audio signal.

5. The network device of claim 4, wherein the one or more playback devices comprise the playback device.

6. The network device of claim 1, wherein the functions further comprise:
   prior to detecting the first audio signal, receiving an input to calibrate the microphone of the network device.

7. The network device of claim 1, wherein the functions further comprise:
   prior to detecting the first audio signal, providing on a graphical interface, a graphical representation indicating that the network device is to be positioned within the predetermined physical range of the microphone of the playback device.

8. The network device of claim 1, wherein the functions further comprise:
   prior to detecting the first audio signal, determining that the network device is positioned within the predetermined physical range of the microphone of the playback device.

9. The network device of claim 1, wherein generating the microphone calibration algorithm comprises:
   transmitting to a computing device, data indicating the first audio signal; and
   receiving from the computing device, the microphone calibration algorithm.

10. A computing device comprising: one or more processors; and a tangible non-transitory computer-readable memory having stored thereon instructions executable by the one or more processors to cause the computing device to perform functions comprising: receiving from a network device, data indicating a first audio signal detected by a microphone of the network device while the network device was positioned within a predetermined physical range of a microphone of a playback device; receiving data indicating a second audio signal detected by the microphone of the playback device based on (i) the data indicating the first audio signal, (ii) the data indicating the second audio signal, and (iii) an acoustic characteristic of the microphone of the playback device, determining an acoustic characteristic of the microphone of the network device; generating a microphone calibration algorithm based on the determined acoustic characteristic of the microphone of the network device; and applying the microphone calibration algorithm when performing an acoustic calibration of the playback device in association with the network device.

11. The computing device of claim 10, wherein the functions further comprise:
   transmitting to the network device, data indicating the microphone calibration algorithm.

12. The computing device of claim 10, wherein the functions further comprise:
   causing for storage in a database, an association between the generated microphone calibration algorithm and one or more characteristics of the microphone of the network device.

13. The computing device of claim 10, wherein the network device is a first network device, wherein the microphone calibration algorithm is a first microphone calibration algorithm, and wherein the functions further comprise:
   receiving from a second network device, data indicating a third audio signal detected by a microphone of the second network device while the second network device is positioned within the predetermined physical range of the microphone of the playback device;
   based on the data indicating the third audio signal and the data indicating the second audio signal, generating a second microphone calibration algorithm; and
   causing for storage in a database, an association between the generated second microphone calibration algorithm and one or more characteristics of the microphone of the second network device.

14. The computing device of claim 13, wherein the functions further comprise:
   transmitting to the second network device, data indicating the second microphone calibration algorithm.

15. The computing device of claim 13, further comprising:
   determining that the microphone of the first network device and the microphone of the second network device are substantially the same;
   responsively generating a third microphone calibration algorithm based on the first microphone calibration algorithm and the second microphone calibration algorithm; and
   causing for storage in the database, an association between the generated third microphone calibration algorithm and one or more characteristics of the microphone of the first network device.

16. Tangible, non-transitory computer readable medium having stored thereon instructions executable by a computing device to cause the computing device to perform functions comprising:
   receiving from a network device, data indicating a first audio signal detected by a microphone of the network device while the network device was positioned within a predetermined physical range of a microphone of a playback device;
   receiving data indicating a second audio signal detected by the microphone of the playback device;
   based on (i) data indicating the first audio signal, (ii) the data indicating the second audio signal, and (iii) an acoustic characteristic of the microphone of the playback device, determining an acoustic characteristic of the microphone of the network device;
   generating a microphone calibration algorithm based on the determined acoustic characteristic of the microphone of the network device; and
   causing for storage in a database, an association between the generated microphone calibration algorithm and one or more characteristics of the microphone of the network device.

17. The tangible, non-transitory computer readable medium of claim 16, wherein the functions further comprise:
   transmitting to the network device, data indicating the generated microphone calibration algorithm.

18. The tangible, non-transitory computer readable medium of claim 16, wherein receiving the data indicating the second audio signal detected by the microphone of the playback device comprises:
   receiving from the playback device, the data indicating the second audio signal detected by the microphone of the playback device.

19. The tangible, non-transitory computer readable medium of claim 16, wherein receiving the data indicating the second audio signal detected by the microphone of the playback device comprises:
   receiving from the network device, the data indicating the second audio signal detected by the microphone of the playback device.

20. The tangible, non-transitory computer readable medium of claim 16, further comprising:
   prior to receiving the data indicating the first audio signal, causing one or more playback devices to play a third audio signal, wherein the first audio signal comprises a portion corresponding to the third audio signal.

* * * * *